United States Patent
Schön et al.

(10) Patent No.: US 12,485,546 B2
(45) Date of Patent: Dec. 2, 2025

(54) TELEOPERATION SYSTEM AND METHOD THEREOF

(71) Applicant: Honda Motor Co., Ltd., Tokyo (JP)

(72) Inventors: Oliver Schön, Offenbach (DE); Dirk Ruiken, Offenbach (DE); Mathias Franzius, Offenbach (DE); Martin Weigel, Giessen (DE)

(73) Assignee: Honda Motor Co., Ltd., Tokyo (JP)

( * ) Notice: Subject to any disclaimer, the term of this patent is extended or adjusted under 35 U.S.C. 154(b) by 260 days.

(21) Appl. No.: 18/361,918

(22) Filed: Jul. 31, 2023

(65) Prior Publication Data
US 2025/0042033 A1 Feb. 6, 2025

(51) Int. Cl.
*B25J 9/16* (2006.01)
*G05B 19/4155* (2006.01)

(52) U.S. Cl.
CPC ........ *B25J 9/1689* (2013.01); *G05B 19/4155* (2013.01); *G05B 2219/40174* (2013.01)

(58) Field of Classification Search
CPC .............. B25J 9/1689; G05B 19/4155; G05B 2219/40174
See application file for complete search history.

(56) References Cited

U.S. PATENT DOCUMENTS

| 7,620,477 | B2 | 11/2009 | Bruemmer |
| 8,271,132 | B2 | 9/2012 | Nielsen et al. |
| 9,880,551 | B2 | 1/2018 | Lacaze et al. |
| 2010/0100240 | A1* | 4/2010 | Wang ........................ H04N 7/15 901/14 |
| 2011/0054689 | A1 | 3/2011 | Nielsen et al. |
| 2013/0331644 | A1* | 12/2013 | Pandya .................. A61B 34/30 600/102 |

(Continued)

FOREIGN PATENT DOCUMENTS

EP 1365300 11/2003

OTHER PUBLICATIONS

C. Hellert et al., "A High Level Active Perception Concept for UAV Mission Scenarios", Deutscher Luft- und Raumfahrtkongress 2012 (The German Aerospace Congress 2012), Sep. 2012, pp. 1-9.

(Continued)

*Primary Examiner* — Abby Lin
*Assistant Examiner* — Danielle M Jackson
(74) *Attorney, Agent, or Firm* — JCIPRNET (57) ABSTRACT

A method and teleoperation system, includes provision of first information on an environment of a teleoperated device by at least one sensor module that is included in the teleoperated device and prediction of an action intended by the operator based on an input of the operator by an action predictor module that is included in the information gathering assistant module. It is determined whether first information on an environment is sufficient to execute the intended action in the environment by a reasoning agent module. Then second information on the environment is determined, which is suitable to enhance the environment information which is useful to execute the intended action in the environment by the reasoning agent module. Provision of second information is controlled by at least one information provision unit, and the first and second information on the environment is fused by an information fusion module.

15 Claims, 8 Drawing Sheets

(56) References Cited

U.S. PATENT DOCUMENTS

2018/0293736 A1* 10/2018 Rahimi ............... G06V 10/454
2020/0030991 A1* 1/2020 Bailey .................. A61B 34/20
2020/0126297 A1* 4/2020 Tian ..................... G06T 7/0012

OTHER PUBLICATIONS

F.J. Perez-Grau et al., "Semi-Autonomous Teleoperation of UAVs in Search and Rescue Scenarios", 2017 International Conference on Unmanned Aircraft Systems (ICUAS), Jun. 2017, pp. 1-10.
Hellert, C., et al., "A high level active perception concept for UAV mission scenarios," Deutsche Gesellschaft für Luft-und Raumfahrt-Lilienthal-Oberth eV, Sep. 2012, pp. 1-9.

* cited by examiner

TELEOPERATION SYSTEM AND METHOD THEREOF

BACKGROUND

Technical Field

The disclosure concerns the general field of robotics and assistance systems. In particular, a teleoperation system that improves perception and a method thereof is proposed.

Related Art

Teleoperation systems enable humans to control teleoperated devices remotely. The human operators do not have to share the same physical space when operating a teleoperated device. This is particularly useful for work in dangerous or challenging environments. Such environments are for instance unstructured environments, underwater environments or hazardous environments wherein execution of tasks is challenging or impossible for operators. However, due to the distance between the operator and the teleoperated device it becomes difficult for the operator to acquire details about the environment and understand it based on the limited sensor data of the system. For instance, a view deteriorates due to occlusions in the environment. Consequently, detailed information about existence or specific shape of objects might not be acquired. In case of a 3D representation of the environment, e.g., in virtual reality, this results in a VR scene that only provides limited feedback to the operator and might not fully comply with the real environment. Due to the missing details of the environment, the usability of assistance functions like grasping assistance might be limited. Moreover, the teleoperated device might not be able to reach the location that provides visual information about the points of interest of the operator either due to an already performing interaction, robot limitations, or the conditions of the terrain. As a result, the operator might not be able to understand or interpret the scene to its full extent. Thus, additional information about the environment would be helpful or even necessary for executing a respective task or an intended action by teleoperation within such an environment.

SUMMARY

The teleoperation system for improving perception and the method thereof according to independent claims address the above-mentioned issues.

The dependent claims define further advantageous embodiments.

The teleoperation system according to the first aspect comprises a teleoperated device, an information gathering assistant module, at least one information provision unit, an information fusion module and a user interface. The teleoperated device comprises at least one sensor module that is configured to provide first information on an environment of the teleoperation system. The user interface comprises an input device that is operable by an operator. The information gathering assistant module comprises an action predictor module and a reasoning agent module. The action predictor module is configured to predict an action intended by the operator based on the input of the operator. The reasoning agent module is configured to determine which second information on the environment is suitable to enhance the environment information. Furthermore, the information gathering assistant module is configured to control provision of the second information on the environment by at least one information provision unit. The information fusion module is configured to fuse first and second information on the environment. Further control of the teleoperated device can then be based on the fused information.

The method for a teleoperation system comprises providing first information on an environment of a teleoperated device by at least one sensor module that is comprised in the teleoperated device. The method further comprises predicting an intended action of an operator based on an input of the operator by an action predictor module that is comprised in the information gathering assistant module. A third step comprises determining which second information on the environment is suitable to enhance the environment information which is used to execute the intended action in the environment by a reasoning agent module that is comprised in the information gathering assistant module. A fourth step comprises controlling provision of second information on the environment by at least one information provision unit by the information gathering assistant module. A fifth step comprises fusing first and second information on the environment by an information fusion module.

BRIEF DESCRIPTION OF THE DRAWINGS

The description of embodiments refers to the enclosed figures, in which.

In the figures, corresponding elements in different figures have same reference signs. The description of the figures dispenses with describing same reference signs in different figures wherever deemed possible without adversely affecting comprehensibility.

DETAILED DESCRIPTION

The proposed invention focuses on teleoperation systems and the limiting factor of availability of information on an environment of a teleoperated device.

The environment of the teleoperated device refers to an environment that surrounds the teleoperated device. For instance, the environment of the teleoperated device can be defined as the configuration space of the teleoperated device that represents the entire space that is reachable by the teleoperated device. However, the environment of the teleoperated device can also represent a certain area of interest depending on individual preferences. To enhance readability, the term "environment of the teleoperated device" is abbreviated with "environment" and if no further description to an environment is provided it should be understood the environment of the teleoperated device.

The performance of operation of teleoperation systems depends on detailed knowledge about the environment and existing objects to provide sufficient feedback to the operator as well as to provide sufficient feedback to subsystems like assisting systems. In particular, the performance of the operation of teleoperation systems depends on specific knowledge that relates to an action of the operator. Thus, detailed knowledge that does not relate to the action of the operator may even deteriorate the performance of operation of teleoperation systems due to an information overload.

Assisting systems may provide assistance like grasping assistance or collision avoidance and any assistance system that supports the operator during the operation of the teleoperation system.

When using a visual representation of the environment, missing details of the environment or information of low quality deteriorate the performance of the operation of the teleoperation system.

Usually, in systems comprising multiple autonomous units, the system requires a task instruction based on which each unit of the system autonomously operates in the environment. However, manually instructing the multiple units in a teleoperation system results in a poor performance due to enormous time delays, which is a major drawback for time-critical teleoperation systems.

Thus, a teleoperation system and a method thereof are proposed that solves the above-mentioned issues.

An embodiment of the teleoperation system comprises a teleoperated device, an information gathering assistant module, at least one information provision unit, an information fusion module and a user interface. The teleoperated device comprises at least one sensor module that is configured to provide first information on an environment of the teleoperation system. The user interface comprises an input device that is operable by an operator. The information gathering assistant module comprises an action predictor module and a reasoning agent module. The action predictor module is configured to predict an intended action of the operator based on the input of the operator. The reasoning agent module is configured to determine which second information on the environment is suitable to enhance the environment information which is useful to execute the intended action in the environment. Furthermore, the information gathering assistant module is configured to control provision of the second information on the environment by at least one information provision unit. The information fusion module is configured to fuse first and second information on the environment.

The first and second information on the environment differ from each other. The first environment information relates to general information on the environment that is provided by at least one sensor module of the teleoperated device. The second environment information is determined and provided based on the prediction of the intended action, contrary to the first information on the environment. It should be noted that determining the usefulness of information for executing the intended action in the environment is not limited to a useful information for the operator but is also understood to be a useful information that can enhance the performance of an assisting system. Thus, the second information on the environment is not necessarily directly understandable by an operator.

Useful information for the second information on the environment may be any information that is not contained in the first information on the environment. However, useful information is preferably either selected based on predetermined features by a person e.g., a cup and handle of a cup when referring to a cup grasping task or based on automatic determination e.g., by an intelligent assistant module.

The intelligent assistance module may be realized in any of the comprised components of the teleoperation system and may be configured to extract relevant information on the environment out of the provided second information on the environment based on the intended action of the operator. Moreover, the intelligent assistance module may be configured to extract relevant information on the environment out of the provided fused information on the environment such that information overload can be prevented.

According to an embodiment of the teleoperation system, the information gathering assistant module comprises a decision engine module that is configured to determine at least one information provision unit that is capable of providing second information on the environment.

Limitation of an information provision unit, which renders the unit incapable of providing second information on the environment may be one of a limited operating range, an energy level, structural capabilities like structure for underwater, ground or air operation, limited capabilities of information provision like sensor resolution and sensor noise and similar limiting quantities of a technical system.

According to an embodiment of the teleoperation system, the information gathering assistant module comprises a decision engine module that is configured to determine the type and/or amount of the at least one information provision unit for providing second information on the environment based on at least one of a current state of the system, operator's preferences and success rates estimated by the reasoning agent.

The current state of the system can refer to one of a current configuration of the teleoperated device like the positional information of the teleoperated device and its relevant portions, a ground condition, available information provision units and similar technical features.

The operator's preferences may refer to predetermined constraints by the operator like selecting to merely determine certain types of information provision units, e.g., information provision units that are able to fly.

The reasoning agent module may be configured to calculate whether information about the occluded area will increase the success rate of the task of the teleoperated device.

The determination of a type can further be based on any of the above-mentioned limitations of an information provision unit.

The determination and/or amount may be based on a result of an optimization problem corresponding to any of the mentioned parameters or abstractly assigned costs thereof.

According to an embodiment of the teleoperation system, the at least one information provision unit comprises an electrical storage and the teleoperation system comprises a base- or charging station to charge the at least one information provision unit. Alternatively, the teleoperated device comprises the base- or charging station.

Charging can be established by a power line that is permanently or removably connected to an information provision unit and the charging station. Alternatively, charging can be established by a charging interface at the charging station, which requires direct attachment of the information provision unit to the charging connector. Alternatively, charging can be established by using induction, which requires appropriate distance and positioning of the information provision unit.

According to an embodiment of the teleoperation system, the first and second information on the environment is fused into a 3D representation. Such 3D representation may be a point cloud, voxels or 3D meshes.

According to an embodiment of the teleoperation system, the user interface comprises a visual interface that is configured to visualize the fused information on the environment.

The visual interface can be configured to visualize the fused information in a 2D or 3D representation. In particular, the 3D representation may be a virtual reality scene. Alternatively or additionally, the visualization renders invisible objects behind the occluding object as outlines. Alternatively or additionally, the visualization may be a real-time representation of the environment. Alternatively or additionally, the visualization may be a 3D representation that is freely explorable by the operator.

The user interface may be configured to be manually operable to set a point of view or to automatically set the point of view for the operator. Automatic setting point of views may be based on a prediction based on the input of the operator in order to reduce the latency of the visualization.

According to an embodiment of the teleoperation system, the reasoning agent module is further configured to determine viewpoints in the environment that define the location at which at least one information provision unit can be positioned in order to provide second information on the environment and/or to determine a region of interest.

Viewpoints may define specific points or a set of points in the environment, where the at least one information provision unit can be positioned to provide second information. A set of points can contain distinctive independent points or adjacent connected points that refer to a region. A region is not necessarily described by every viewpoint that is contained within the region. The region is rather described by representatives for the region, e.g., three points for defining a triangular region of viewpoints in order to reduce the memory usage. Viewpoints are in general abstract positional information that is independent of the available information provision units. However, the viewpoints may also contain the information of which type of information provision unit can be positioned at the location of the corresponding viewpoint. Alternatively or additionally, the determination of the viewpoints may depend on the types of available information provision units in order to avoid determination of infeasible viewpoints.

According to an embodiment of the teleoperation system, the region of interest is determined based on at least one of the inputs of the operator, an assistant function behavior and a determination of a low-quality region.

The operator's input may be any input during operation of the teleoperation system. An exemplary input may be an input of the operator's eyes by an eye tracker. For instance, when the focus of the operator on a specific region of a visualization is determined based on the eye behavior, the region is determined as a region of interest.

Moreover, the region of interest may be determined based on the intended action of the operator and the relevant region of the environment to execute the intended action of the operator. For instance, during a cup grasping task the reasoning agent module may determine environment information of cups and the environment thereof as a region of interest.

An assistance function may support an operator in the execution of a task by taking over certain steps of the execution. Thus, the assistance function may need second information of an environment in order to execute the assistance function. This second information may be inferred from the assistance function behavior and is defined as a region of interest. For instance, an assistance function for autonomous positioning and grasping of a cup may require the exact positioning of a cup handle such that a region containing the cup handle is defined as a region of interest.

A low-quality region may be defined as one of an occluded region, a region wherein movement has been detected, a region wherein a change of the information on the environment has been detected, regions with poor information of the information provision units due to sensor resolution and/or sensor noise and/or sensor quality and/or geometry of the region, regions of critical scene properties due to textureless areas and/or high ambient lighting levels. For instance, textureless areas deteriorate the performance for stereo depth estimation, high ambient lighting levels deteriorates the performance for ToF sensors, or flat angle of view deteriorates the scene understanding.

According to an embodiment of the teleoperation system, the at least one information provision unit is removably attachable to a stationary platform at a position that coincides with any of the determined viewpoints.

Preferably, the position of the at least one information provision unit that is attached to the stationary platform coincides with any of the determined viewpoints.

According to an embodiment of the teleoperation system, the teleoperation system further comprises a persistent memory that is configured to store the fused information on the environment and/or store the past environment information.

According to an embodiment of the teleoperation system, the information gathering assistant module and/or the information provision unit comprise an information provision unit controller that is configured to provide control signals based on which the information provision unit provides second information on the environment.

According to an embodiment of the teleoperation system, the at least one information provision unit comprises at least one of a sensor and a mirror.

According to an embodiment of the teleoperation system, the information provision unit controller is configured to change a pose of at least one of the sensor and the mirror.

The pose can be changed by adjusting an orientation of the sensor or the mirror, respectively. In general, the limit of alignment is provided by the structure in which the sensor or the mirror is embedded.

Preferably, each viewpoint contains information for alignment parameters in order to align the sensor or the mirror or both such that the sensor, the mirror, or both provide second information on the environment.

The mirror may be aligned such that the provided second information on the environment can be acquired by at least one of an information provision unit and at least one sensor module of the teleoperated system.

Preferably, the mirror is aligned such that the acquired second information is optimized by at least one of a resolution of the provided information and an angle of view of the provided information.

According to an embodiment of the teleoperation system, the at least one information provision unit comprises a movable platform and/or a controllable movable platform. Alternatively or additionally, the at least one information provision unit is removably attachable to a movable and/or a controllable movable platform.

The difference between a movable and a controllable movable platform is that the controllable movable platform comprises a movement controller that is configured to control a movement of the controllable movable platform. In addition, the controllable movable platform allows movement of the controllable movable platform by an external force that is applied. In contrast, the movable platform merely allows movement of the movable platform by an external force that is applied.

It should be noted that a stationary platform, a movable platform and a controllable movable platform enable changing a pose of the at least one of the sensor and the mirror either as being comprised in the information provision unit or as being attached to an information provision unit. The difference of a stationary platform and a movable or controllable movable platform is that the stationary platform comprises at least one portion that cannot be translationally moved.

According to an embodiment of the teleoperation system, the controllable movable platform is a portion of the teleoperated device.

According to an embodiment of the teleoperation system, the portion of the teleoperated device belongs to a portion that is controllable without changing the outcome of the intended action of the operator.

An outcome of the intended action of the operator relates to any outcome of an intended action that would occur if the portion of the teleoperated device was not controlled. In particular, the outcome should be compared to the relevant outcome. For instance, when a person is controlling an end-effector of a teleoperated device, merely the position and orientation of the end-effector is relevant. Contrary, a portion of the teleoperated device that allows alignment in different positions and orientations, which still result in the same end-effector position and orientation, is irrelevant for the outcome of the system. Thus, this portion possesses degrees of freedom of movement, which can be controlled without changing the outcome of the intended action of the operator.

According to an embodiment of the teleoperation system, in case that the portion of the teleoperated device belongs to a portion that is not controllable without changing the outcome of the intended action of the operator, the information gathering assistant module comprises a decision agent module that is configured to determine the at least one information provision unit that is attached to the portion of the teleoperated device as being capable of providing second information on the environment only if the movable portion is currently not controlled by the operator.

Thus, interference during simultaneous control can be avoided.

According to an embodiment of the teleoperation system, the information provision unit controller is further configured to calculate a trajectory for a respective controllable movable platform.

The trajectory can be a path and/or a velocity profile.

According to an embodiment of the teleoperation system, the calculated trajectory is updated to avoid collisions with the teleoperated device and the at least one information provision unit.

According to an embodiment of the method for a teleoperation system, the method comprises providing first information on an environment of a teleoperated device by at least one sensor module that is comprised in the teleoperated device. The method further comprises predicting an intended action of an operator based on an input of the operator by an action predictor module that is comprised in the information gathering assistant module. A third step comprises determining which second information on the environment is suitable to enhance the environment information which is useful to execute the intended action in the environment by a reasoning agent module that is comprised in the information gathering assistant module. A forth step comprises controlling provision of second information on the environment by at least one information provision unit by the information gathering assistant module. A fifth step comprises fusing first and second information on the environment by an information fusion module.

Figure 1:
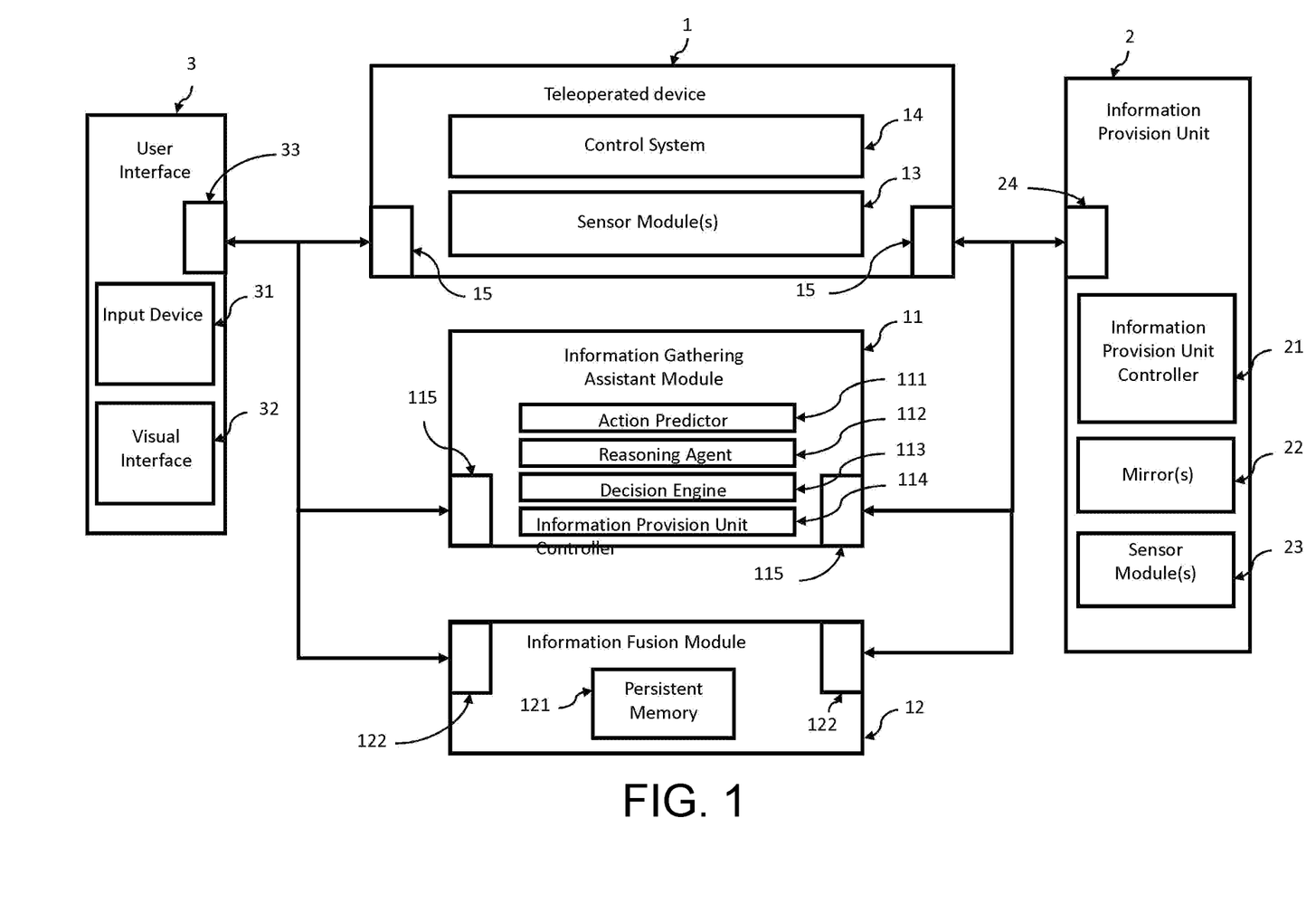
FIG. 1 is a schematic view of the general structure of a teleoperation system according to an embodiment.

FIG. 1 is a schematic view of the general structure of a teleoperation system according to an embodiment. The discussion of the general structure uses the specific example of a system configuration of the teleoperation system. Note that the internal wiring of each unit is not illustrated in order to improve comprehensibility, but the necessary connection of each subcomponent will be clear through the provided description.

The teleoperation system comprises a teleoperated device 1, an information provision unit 2, a user interface, an information gathering assistant module 11 and an information fusion module 12.

The teleoperated device comprises a control system 14, at least one sensor module 13 and a communication interface 15.

The control system 14 is configured to enable manual teleoperation of the teleoperated device 1 based on control inputs as provided by the communication interface 15. Alternatively, the control system 14 can be configured to enable a limited degree of autonomy for the teleoperated device 1 or the control system 14 can be configured to enable full autonomy for the teleoperated device 1 without any necessary amendments in the illustration of the teleoperation system in FIG. 1.

A manual teleoperation requires control inputs that enable complete control of each controllable portion of the teleoperated device. The control inputs are provided through a user interface 3 via a communication between a communication interface 33 of the user interface 3 and the communication interface 15 of the teleoperated device 1.

The control inputs for manual teleoperation consist of low-level control inputs that are transmitted via serial or parallel communication by wired or wireless communication.

Control inputs for fully autonomous teleoperation may be high-level control inputs to interact with the teleoperated device, e.g., "grasp the red cup and put it on the table".

Control inputs for semi-autonomous teleoperation may be both low-level and high-level commands.

Exemplary realizations of serial communication interfaces are RS-232, RS-485, Universal Serial Bus (USB), Serial Peripheral Interface (SPI), Inter-Integrated Circuit (I2C) and Controller Area Network (CAN). Exemplary realizations of parallel communications are Industry Standard Architecture (ISA), Peripheral Component Interconnect (PCI), Small Computer System Interface (SCSI) and Advanced Technology Attachment (ATA). Exemplary realizations of wireless communications are Wi-Fi, Bluetooth, ZigBee and Cellular networks.

The above-mentioned embodiment of the communication interface 15 can be applied to any communication interface (15, 24, 33, 115, 122).

The control system 14 may comprise at least one processing unit that is configured to enable the teleoperation control of the teleoperated device 1. The processing unit may be a microcontroller, a programmable logic controller (PLC), a digital signal processor (DSP), a field-programmable gate array (FPGA), a central processing unit (CPU), a graphics processing unit (GPU) or an application-specific integrated circuit (ASIC).

The at least one sensor module 13 is configured to provide environment information. The environment information may be provided to the control system via an internal electrical connection and/or to the user interface 3 via the communication interface 15. The environment information may be raw sensor data. Alternatively or additionally, the environment information may be processed in the control system 14 before being provided to the user interface 3.

The at least one sensor module 13 may be imaging cameras, multi- and hyperspectral cameras, thermal sensors, thermal cameras, depth sensors (ToF, RGB-D, laser scanners, radar, sonar, etc.) or position sensors (GNSS, IMU, etc.).

The user interface 3 comprises an input device 31, a visual interface 32 and a communication interface 33.

The input device 31 is configured to provide control inputs of an operator. The inputs of an operator are transformed into electrical signals by the user interface 3.

In general, the input device 31 may be any electrical device that enables provision of input for a desired task. For instance, the input device 31 may be a joystick-based interface, a button-based interface, a virtual reality interface, a graphical user interface, a mobile application interface or a speech-based interface. Alternatively or additionally, the input device 31 may be a mixture of several listed interfaces.

The electrical signals may be provided to the communication interface 33 and alternatively and/or additionally to the visual interface 32.

The visual interface 32 is configured to provide a visual representation of the information on the environment.

The visual interface 32 may be any interface that enables visual representation of the information on the environment. For instance, the visual interface 32 may be a graphical user interface of a 2D or a 3D environment representation. Specifically, the 3D environment representation may be a virtual environment. The visual interface 32 visualizes the information on the environment based on an input of the operator, information on the environment by the teleoperated device 1 and/or the information provision unit 2.

The operator may move and rotate his viewpoint by operating the input device 31. In case that the operator's viewpoint differs from the teleoperated device 1, such that the teleoperated device 1 cannot provide the viewpoint by the at least one sensor module 13, the information provision unit may autonomously provide information on the environment for the corresponding viewpoint.

The information provision unit 2 comprises an information provision unit controller 21, at least one mirror 22 and at least one sensor module 23.

The information provision unit controller 21 is configured to control the information provision unit 2. The control may be related to movement control of the information provision unit 2 and processing of the information provided by the at least one sensor module 23. The information provision unit controller 21 may be configured to determine control based on inputs provided by the communication interface 24 or to execute control commands provided by the communication interface 24 or to send control commands to the information provision unit 2.

The inputs and/or control commands may be provided by the teleoperated device 1, the information gathering assistant module 11 and the information fusion module 12.

Although, the information provision unit 2 is preferably controlled autonomously by external or internal control signals, the information provision unit 2 may also be controlled by an operator (manually) via external or internal control signals.

The at least one mirror 22 may be a flat, concave or convex mirror.

The at least one sensor module 23 may be configured in a similar manner as mentioned for the at least one sensor module 13.

Integration of multiple sensors (13, 22, 23) in a teleoperation system into one consistent environment representation typically requires the estimation of each sensor's (13, 22, 23) pose relative to each other and to the teleoperated device 1. While the pose of sensors 13 that are mounted on the teleoperated device 1 can often be estimated using the known geometry of the sensor mounting on the teleoperated device 1 and the often highly accurate measured kinematics of the teleoperated device 1, determination of poses of sensors (22, 23) that are not directly attached to the teleoperated device 1 is harder. Methods to support such sensor pose determination (also known as calibration) include Visual SLAM, visual registration, IMU, kinematics of actuators of the teleoperated device 1 attached to a sensor. Further methods to support such pose determination include (visual) detection of sensor from other sensors (which have known transformation to a reference system), e.g., by visual 6D pose estimation of the sensor, possibly supported by designing the sensor housing to be visually unique, easy to detect, and supporting position and orientation estimation, e.g., by placing one or multiple AR/QR codes on sensor housing, or by placing retroreflective markers as for a VICON system.

Electrical modules like the at least one sensor module 23, require batteries or wired power connections and data connection, e.g., cabled or wireless. Moving tethered/wired sensors in a scene by a teleoperated device 1 can be difficult because of wire routing requirements. Furthermore, battery-powered devices require periodic recharging of empty battery. Regardless of power and data communication, active sensors are typically costly. Contrary, mirrors 22 do not require power or data connections and can nevertheless provide valuable information on the environment, e.g., reducing occlusions, if imaged from another sensor module (13, 23) at a suitable pose. The placement of mirrors 22 is preferably optimized together with the placement of at least one sensor module 23 for imaging in order to use both sensing the provided information on the environment by the mirrors 22 and suitable other parts of the environment. Like for other sensors, the determination of a mirror's pose can be supported by the above-mentioned techniques. In the simplest form, the mirror 22 is a flat mirror that does not change the imaging characteristics of the sensor module (13, 23) imaging the mirror 22, except for the changed perspective. A mirror 22 can also be a non-flat mirror, e.g., convex or concave, or be composed of multiple mirrors and/or lenses to provide a preferred imaging characteristic like field of view and resolution for certain parts of a scene. A mirror 22 may include actuators to change optical characteristics, e.g., the surface curvature.

In a teleoperation system, multiple information provision units 2 can be available in a storage area close to the work area. An information provision unit 2 can be self-actuated, e.g., as a wheeled rover or as a flying drone, or unactuated, i.e., requiring the teleoperated device 1 to move it or be moved by other actuated information provision units 2. Unactuated information provision units 2 have the advantage of simplicity and lower cost than actuated information provision units 2. However, unactuated information provision units 2 can only be moved by applying external forces, e.g., passively by wind or water or actively by the teleoperated device 1 or other actuated information provision units 2. Actuated information provision units 2 are more flexible as they can move on their own and do not require additional assistance and will less likely require operator involvement and/or interrupt the robotic manipulation of the scene.

The information gathering assistance module 11 comprises an action predictor module 111, a reasoning agent module 112, a decision engine module 113 and an information provision unit controller 114.

The action predictor module 111 is configured to analyze the input of from the operator provided by the user interface 3, and to predict the intended action, including current and future actions.

The reasoning agent module 112 is configured to compute required and/or suitable environment information as well as further viewpoints for the predicted action and to estimate the performance and the corresponding costs of gathering the required environment information. Gathering the required and/or suitable information on the environment can enhance the understanding of the environment. The required and/or suitable information on the environment can depend on information required and/or suitable for the operator, e.g., to show a new viewpoint in the scene or on missing information with respect to the provided information of the at least one module 13 that is required and/or suitable for execution of a task by the teleoperated device 1 and/or for assistance capabilities of the teleoperated device 1, e.g., details of the backside of an object that should be grasped.

Furthermore, the reasoning agent module 112 may be configured to determine a region of interest based on the input of an operator, a detected occlusion in the environment or a detected change of the information on the environment.

The reasoning agent module 112 may be configured to calculate whether information about the occluded area will increase the success rate of the teleoperated device's 1 task or increase the support for the operator in understanding the scene.

The decision engine module 113 is configured to determine the information provision unit 2 and the amount thereof to gather the required and/or suitable information. Furthermore, the decision engine module 113 informs the information provision unit controller 21, 114 or the control system 14 to autonomously execute assistance functionality to gather the required and/or suitable information. The determination of the decision engine module 113 can be based on the current state of the system, the operator's preferences or the success rates determined by the reasoning agent module 112. If the required and/or suitable information cannot be provided from the at least one sensor module 13 of the teleoperated device 1 or is preferably provided by the information provision unit 2, the information provision unit controller 21, 114 autonomously executes assistance functionality to gather required and/or suitable information by controlling the information provision unit 2. Otherwise, if the required and/or suitable information can be sufficiently provided by the teleoperated device 1, the control system 14 executes assistance functionality to gather required and/or suitable information by controlling the at least one sensor module 13. Moreover, the decision engine module 113 may be configured to inform the control system 14 and the information provision unit controller 21, 114, if it determines to distribute the provision of required and/or suitable information on the teleoperated device 1 and the information provision unit 2.

In particular, required and/or suitable information or a part thereof may not be provided by the teleoperated device 1 in a low-quality region that has been defined before.

The decision engine module 113 determines the units for gathering required and/or suitable information based on common optimization parameters, like time and energy costs.

The information provision unit controller 114 may be configured similarly to the information provision unit controller 21. Furthermore, one or both information provision unit controllers 21, 114 may be configured to compute trajectories for controllable movable information provision units and/or placement strategies at viewpoints determined by the reasoning agent module 112 for controllable movable and movable information provision units.

The information fusion module 12 comprises a persistent memory 121. The information fusion module 12 is configured to fuse information on the environment as input via the communication interface 122.

The fused information on the environment is stored in a persistent memory 121 and can be used by the teleoperated device 1 in different ways. First, the control system 14 can use the fused data to support the operator by providing assisted teleoperation functions, e.g., collision avoidance. Further, the fused data can be provided to the operator to improve feedback, e.g., higher level of detail in a visual representation shown to the operator, or provide additional acoustic or haptic feedback.

Figure 2:
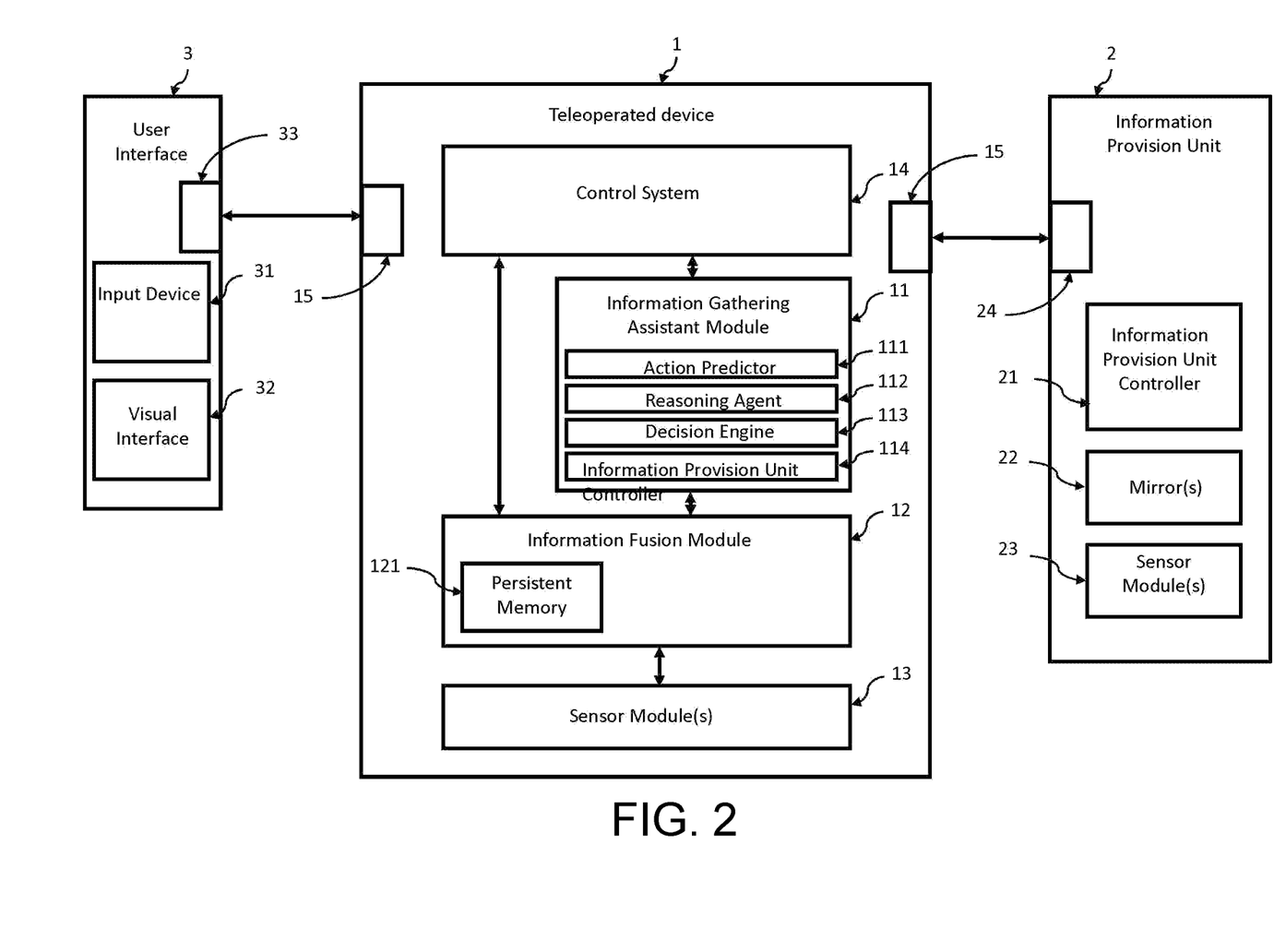
FIG. 2 is a schematic view of another general structure of a teleoperation system according to an embodiment.

FIG. 2 is a schematic diagram of another general structure of a teleoperation system according to an embodiment. The only difference herein is given by the fact that the teleoperated device 1 further comprises the information gathering assistant module 11 and the information fusion module 12. Thus, since the configuration of the units of the schematic diagram of the other general structure in FIG. 2 is similar to the configuration of the units of the schematic diagram of FIG. 1, it is referred to the description of FIG. 1 for understanding the configuration of any depicted unit in FIG. 2. It should be noted that the communication interface 15 is also accessible internally by the information gathering assistance module 11 and the information fusion module 12. Furthermore, each internal component of the teleoperated device 1 may communicate with each other.

Figure 3:
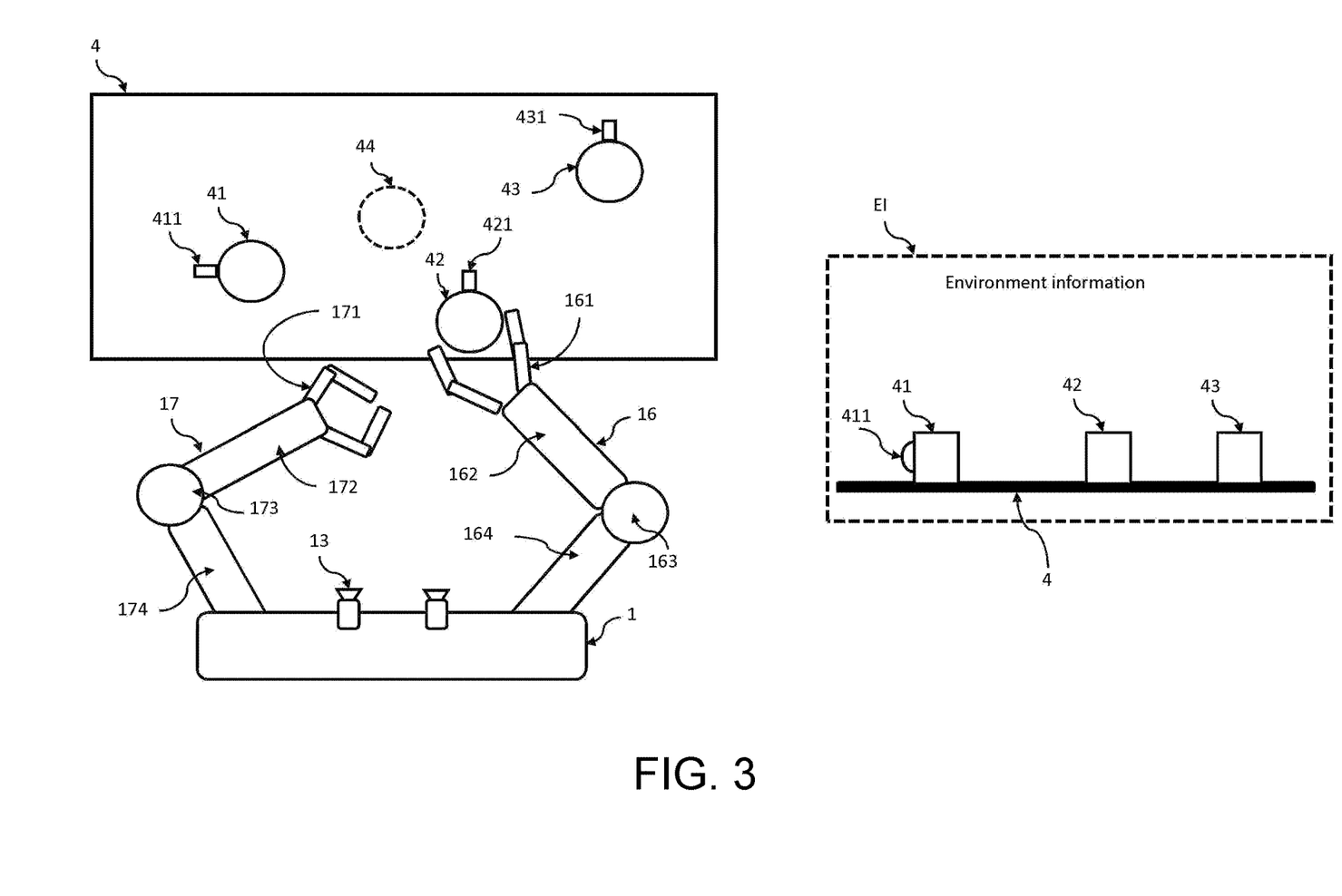
FIG. 3 is an exemplary cup grasping task illustration of a teleoperation system according to an inventive embodiment.

FIG. 3 is an exemplary cup grasping task illustration of a teleoperation system according to an inventive embodiment.

For instance, when using a virtual reality interface, such as the Valve Index VR kit used for the input device 31 and the visual interface 32 in form of two input controllers, the motion of the operators arm movements are represented as an input of the operator and are transferred to a teleoperated device 1 via the above-mentioned communication channel. The teleoperated device 1 can grasp and move objects in the environment with its arms 16, 17 based on the inputs of the operator. In particular, the arms 16, 17 are equipped with end-effectors 161, 171 that are configured to execute the relevant task. The linkages 162, 164, 172, 174 are used to fix and extend the reaching range of the end-effector 161, 171. The teleoperated device joints 163, 173 serve as a degree of freedom that enables positioning the adjacent linkages 162, 164, 172, 174 by rotation of the teleoperated device joints 163, 174. For purposes of increasing comprehensibility further teleoperated device joints at positions of the end-effectors 161, 171 are neglected. The stereo camera 13 is used to provide information on the environment. The teleoperated device 1 is configured similarly to the teleoperated device 1 as explained in the description of FIG. 1. The teleoperated device 1 is stationary.

The cup grasping task setup comprises a table 4 and cups 41, 42, 43 placed at different location at the table 4. One exemplary task might be to move cup 42 towards a target position 44. Based on the current positioning of the teleoperated device 1, the stereo camera 13 provides information on the environment EI. It should be noted that the representation of the environment for EI and FEI of FIGS. 3 to 7 are merely schematic representations to avoid unnecessary complexity. However in general, the (fused) environment information EI and FEI must follow geometric rules when reconstructed. The environment information EI shows the scene comprising the table 4 and three cups 41, 42, 43. However, the operator and/or the teleoperated device 1 are only aware of the handle 411 of cup 41. Since the task is to move cup 42 to the target position 44, information on the environment is missing due to occlusion of the handle 421 by the cup 42. Thus, the performance of the robot 1 regarding this task is deteriorated due to the current positioning of the teleoperated device, since the position of the handle 421 is not visible. Moreover, the assistance function of the teleoperated device like semi-autonomous grasping of a handle cannot work, since no handle of the cup 42 has been detected yet.

Figure 4:
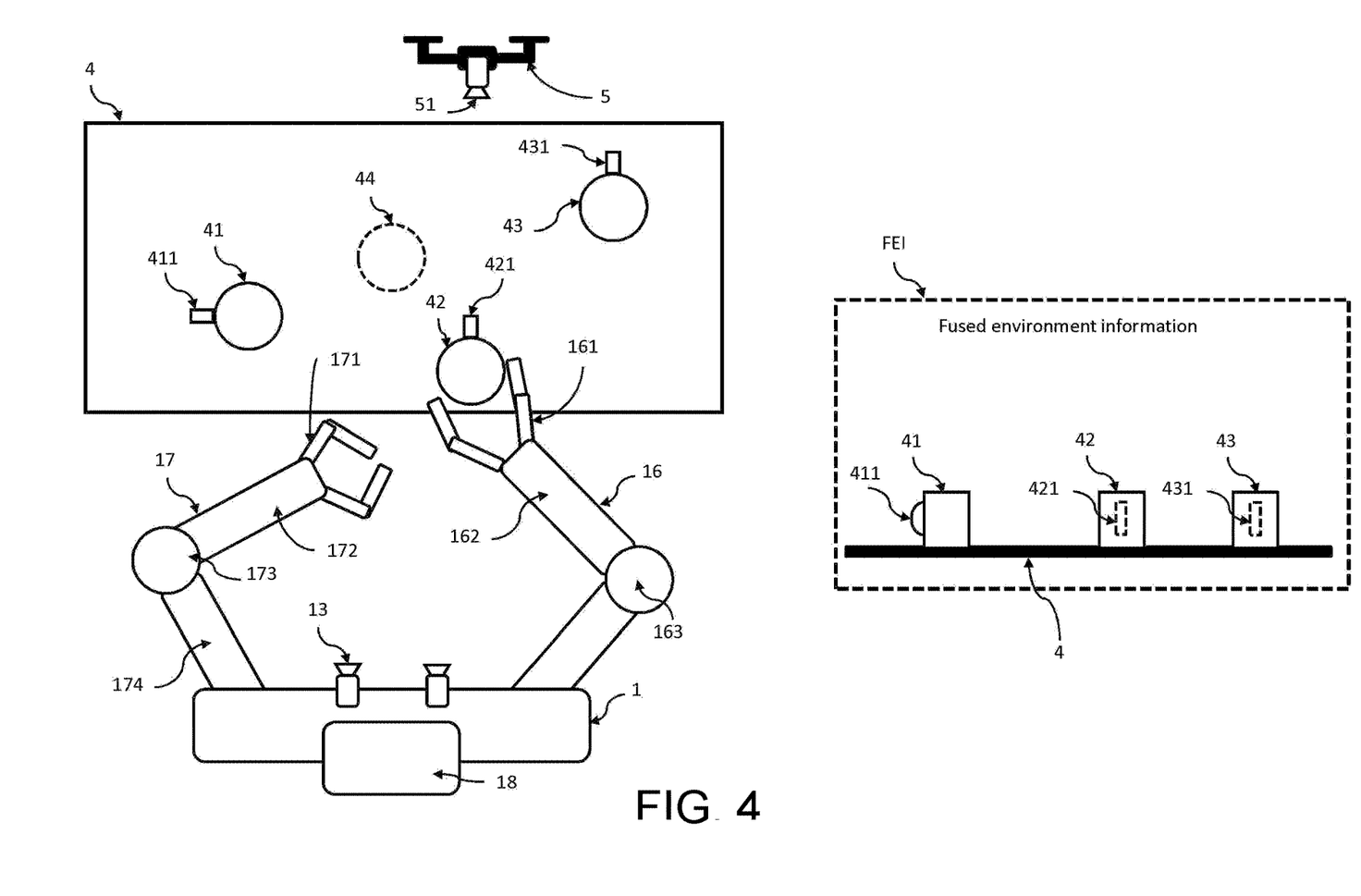
FIG. 4 is an exemplary cup grasping task illustration of a teleoperation system according to an embodiment including a first information provision unit.

FIG. 4 is an exemplary cup grasping task illustration of a teleoperation system according to an embodiment including a first information provision unit. As this teleoperation system merely differs in including the information provision unit 5 which enhances the environment information, the following description will focus on the information provision unit 5 and the second environment information and for a detailed description of the remaining configurations it is referred to the description of FIG. 3.

In the embodiment, the information provision unit 5 is a drone that comprises a camera 51. The drone is configured similar to the information provision unit 2 as described in FIG. 1. Thus, the camera 51 could be replaced by a mirror or combined with a mirror.

Based on the inputs of the operator via the virtual reality interface, the teleoperation system is configured to predict the desired actions of the operator. For instance, which item the operator wants to grasp based on the input of the input controller and from which viewpoint the operator wants to view the scene based on the input of the headset. Based on this knowledge, the teleoperated device 1 computes trajectories for the drone 2 to gather information from the required viewpoints to better understand the geometry of the items.

The drone 5 starts form the base—or charging station 18 of the drone 5 and flies towards the determined viewpoint Hence, the viewpoint at which the drone 5 is positioned either results from the above mentioned prediction or due to the change of a virtual head pose of the operator. The additional information on the environment as provided by the drone 5 is made available for the teleoperated device 1 and its information fusion module 12. For instance, the camera data is streamed towards a wireless access point on the teleoperated device 1. Consequently, a fused environment information FEI can be constructed by fusing the new information on the environment with the data of the teleoperated device's 1 own stereo camera 15, which enables the operator and/or the teleoperated device 1 to see the position of the handle 421 of cup 42, based on which the performance of the cup grasping task is increased.

The flight trajectory might be continuously updated through wireless communication with the drone 5. Especially, to avoid collision of the drone 5 and the teleoperated device 1, taking the predicted movement trajectories of both, the drone 5 and the teleoperated device 1 into account.

The operator sees this view through a VR headset. Moving and rotating his body and head allows the operator to freely change the viewpoint in the environment. When the operator's viewpoint differs too much from the teleoperated device 1, additional drones 5 start from the base- or charging station 18 to provide information on the environment from the operator's position without much latency. The drones 5 raw camera stream is annotated with the additional fused image data as before, e.g., outlining objects behind walls or objects. Finally, when the drones 5 task is achieved or its battery runs low, the drone 5 returns to its base- or charging station 18. If the task is still unfinished, another drone 5 might be used to replace the returning drone 5.

Figure 5:
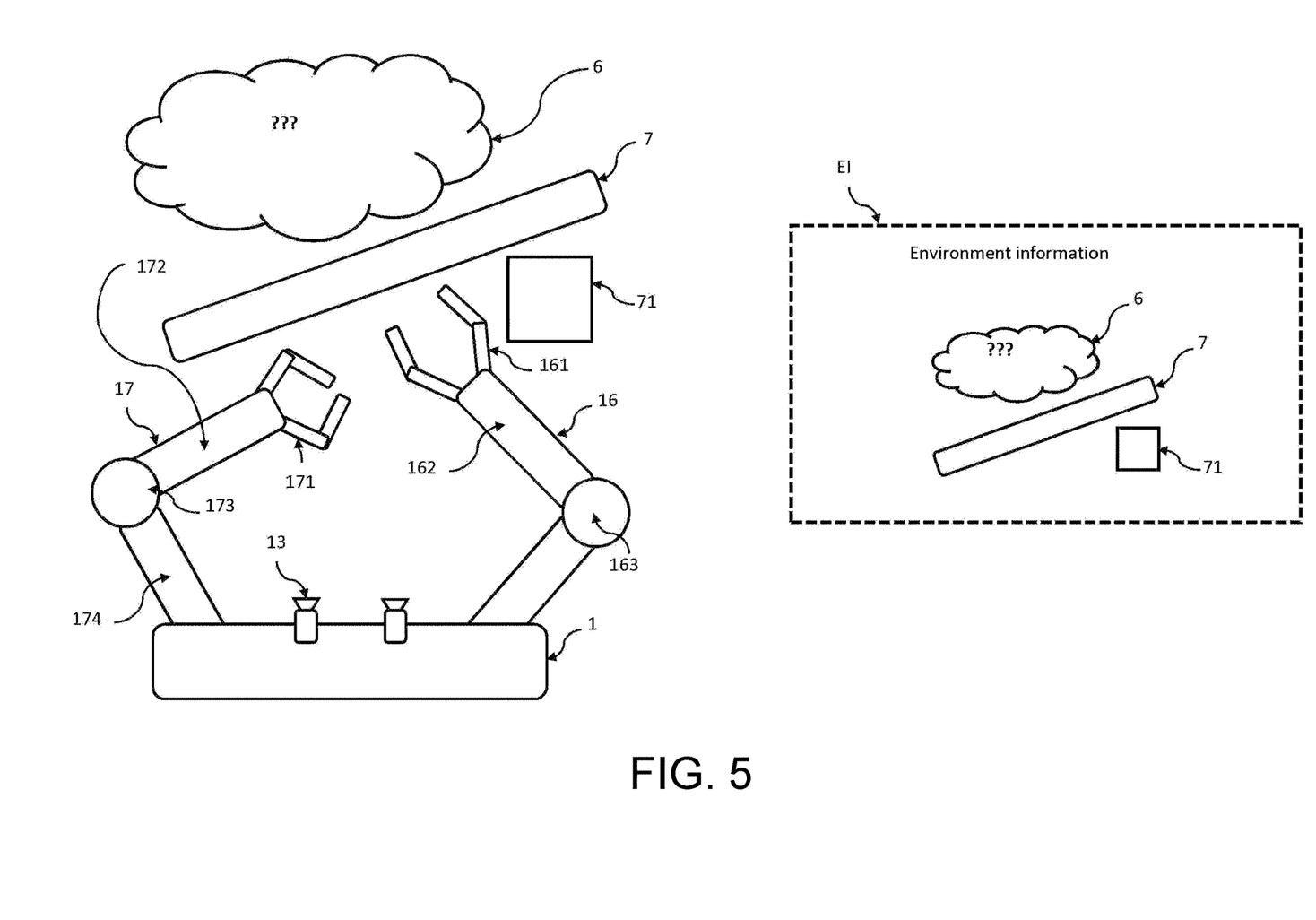
FIG. 5 is an exemplary general task illustration of a teleoperation system according to an inventive embodiment.

FIG. 5 is an exemplary general task illustration of a teleoperation system according to an inventive embodiment.

The teleoperated device 1 is the same teleoperated device 1 as described in FIG. 2 and FIG. 3 such that for a detailed description of teleoperated device 1 it is referred to the foregoing description of FIG. 3 and FIG. 4.

In FIG. 5 a general scenario comprising an obstacle 71 and a wall 7 is observed by the teleoperated device 1. The information on the environment is schematically illustrated in EI. Again, the environment information EI is obtained by the camera system 13, stored by the teleoperated device 1 and provided to the operator as previously described in FIG. 3.

It is apparent that the teleoperated device 1 does not know what is behind the wall 7. Such an occluded region can be defined as a region of interest 6.

Figure 6:
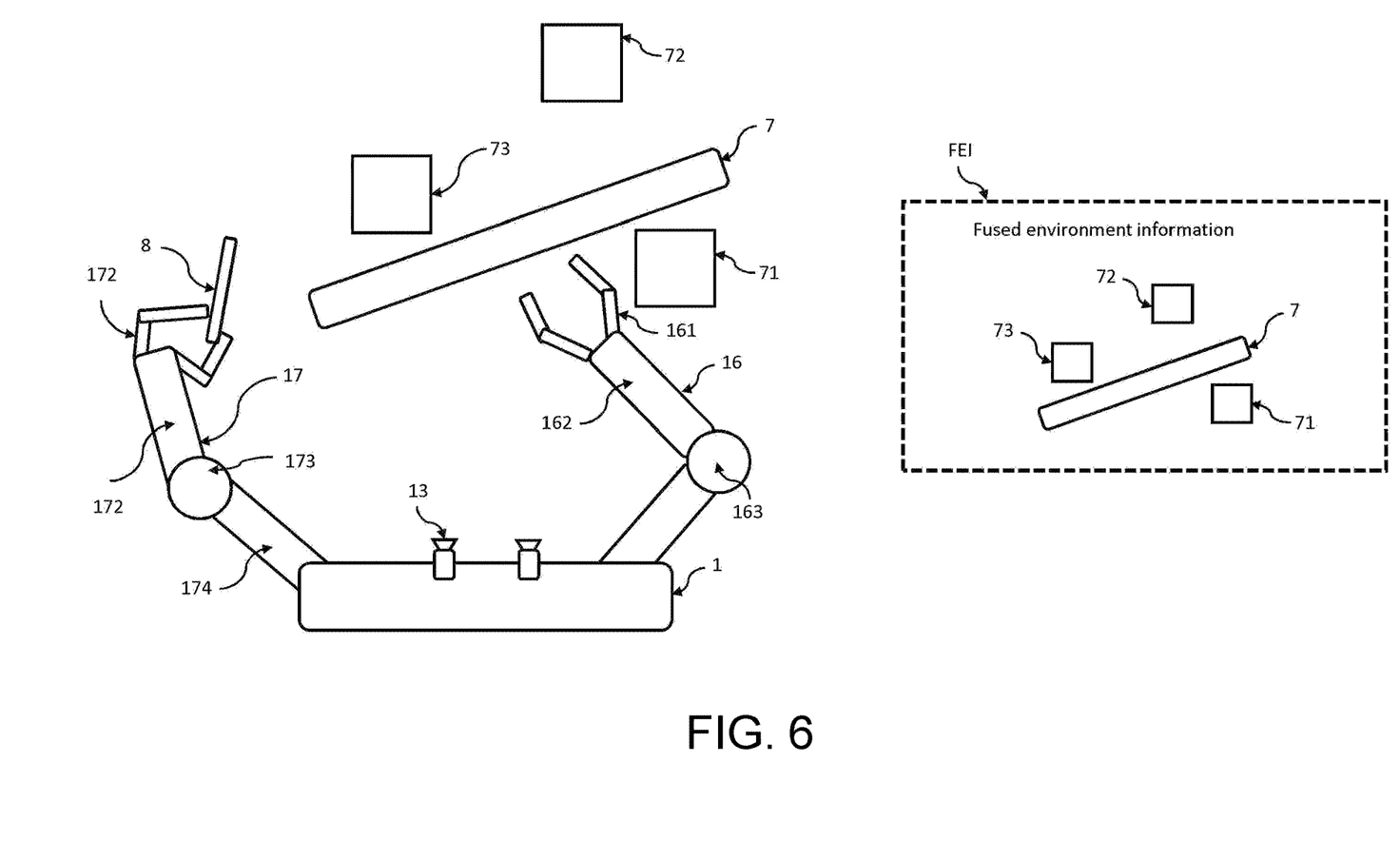
FIG. 6 is an exemplary general task illustration of a teleoperation system according to an embodiment including a second information provision unit.

FIG. 6 is an exemplary general task illustration of a teleoperation system according to an embodiment including a second information provision unit.

In this embodiment, the second information provision unit 8 is a mirror. The mirror 8 is positioned by the teleoperated device 1 in order to provide environment information about the region of interest 6 of FIG. 5. This can be achieved by rotating the mirror 8 such that the stereo camera 13 is able to acquire the provided environment information via the mirror 8. Based on the knowledge of the positions of the mirror 8 and the stereo camera 13 it is possible to reconstruct the environment information of the region of interest 6 by using rather simple optical geometric rules. Consequently, two further obstacles (72, 73) may be made visible in the fused environment information FEI.

Figure 7:
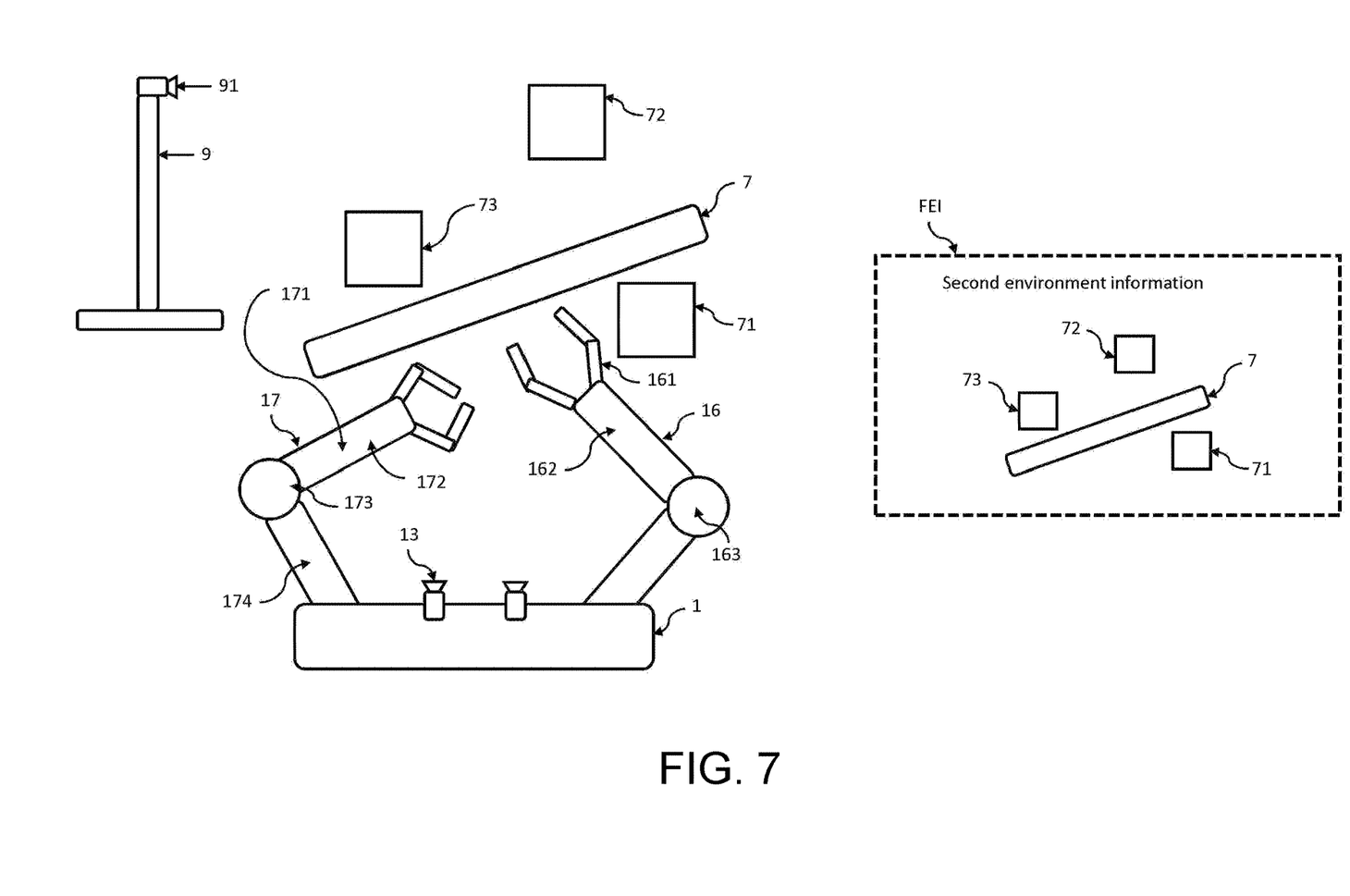
FIG. 7 is another exemplary general task illustration of a teleoperation system according to an embodiment including a third information provision unit.

FIG. 7 is another exemplary general task illustration of a teleoperation system according to an embodiment including a third information provision unit 9.

The third information provision unit 9 is a stationary or movable platform with a camera 91 attached. Preferably, the stationary platform 9 is located at a position that reduces occurrence of occluded areas. Since the view of the camera 91 is not occluded, the region of interest 6 of FIG. 5 can be observed which results in the fused environment information FEI with two additionally determined obstacles (72, 73).

If the platform 9 is movable, the teleoperated device 1 could be configured to move the platform 9 to a position that enables provision of information for the region of interest 6 of FIG. 5.

Figure 8:
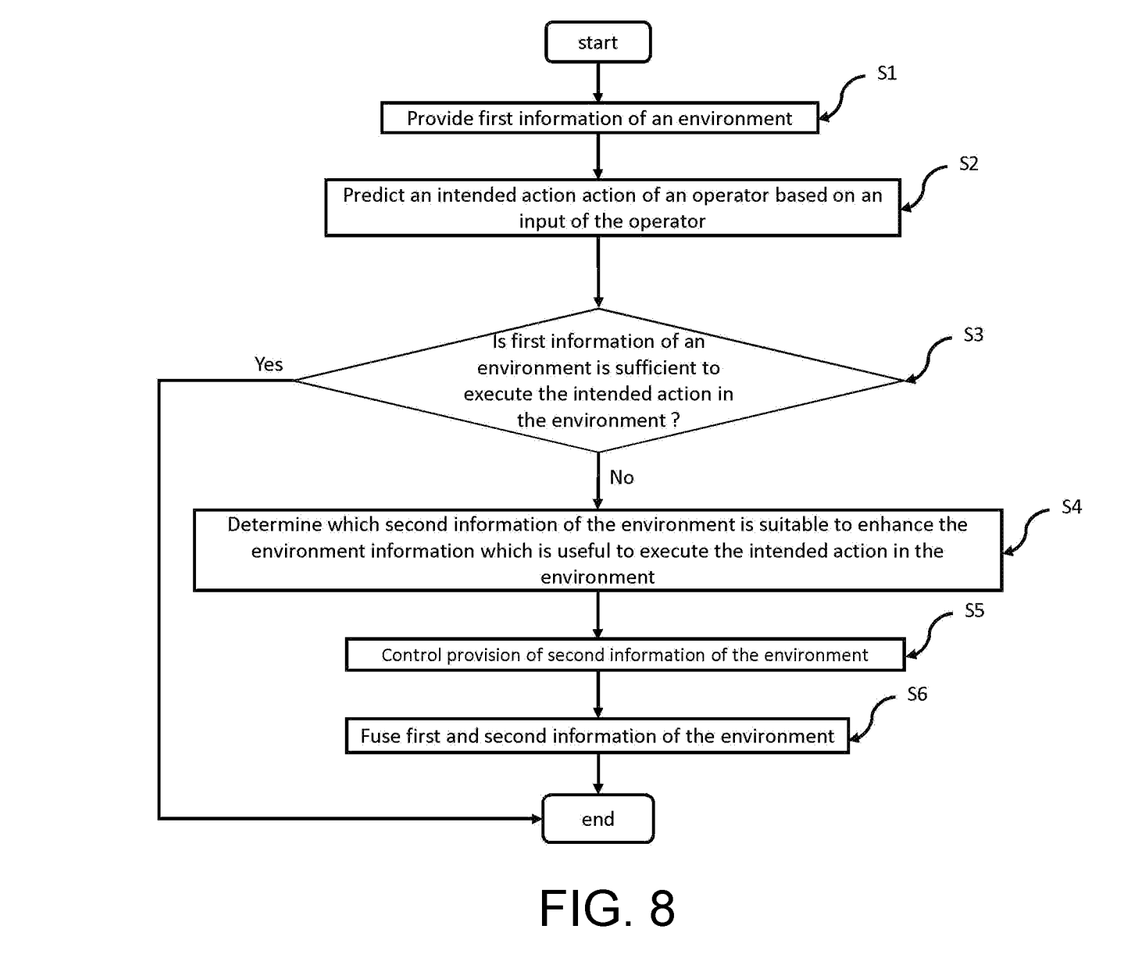
FIG. 8 provides a method for the teleoperation system according to an embodiment.

FIG. 8 provides a method for the teleoperation system according to an embodiment.

Step S1 comprises providing first information of an environment. This step can be executed by at least one sensor module that is comprised in the teleoperated device 1.

Step S2 comprises predicting an intended action of an operator based on an input of the operator. This step can be executed by an action predictor module that is comprised in the information gathering assistant module.

Step S3 comprises determining if the first information of an environment is sufficient to execute the intended action in the environment. If it is sufficient, the method ends. If not, the method continues with step S4. This step can be executed by a reasoning agent module that is comprised in the information gathering assistant module.

Step S4 comprises determining which second information on the environment is suitable to enhance the environment information which is useful to execute the intended action in the environment. This step can be executed by the reasoning agent module.

Step S5 comprises controlling provision of second information on the environment. This step can be executed by the information gathering assistant module.

Step S6 comprises fusing first and second information on the environment. This step can be executed by an information fusion module.

What is claimed is:

1. A teleoperation system, comprising:
a teleoperated device;
an information gathering assistant module;
at least one information provision unit,
wherein
the at least one information provision unit comprises a movable platform and/or a controllable movable platform, and/or is removably attachable to the movable platform and/or the controllable movable platform, and
the controllable movable platform is a portion of the teleoperated device;
an information fusion module; and
a user interface,
wherein
the teleoperated device comprises at least one sensor module that is configured to provide first information on an environment of the teleoperated system,
the user interface comprises an input device,
the information gathering assistant module comprises an action predictor module configured to predict an intended action based on an input of the operator and a reasoning agent module configured to determine second information on the environment, and is configured to control provision of the second information on the environment by the at least one information provision unit,
wherein in a case that the portion of the teleoperated device belongs to a portion that is not controllable without changing the outcome of the intended action of the operator,
the information gathering assistant module comprises a decision agent module that is configured to determine the at least one information provision unit that is attached to the portion of the teleoperated device as being capable of providing the second information on the environment only if the controllable movable portion is currently not controlled by the operator, and
the information fusion module is configured to fuse the first and second information.

2. The teleoperation system according to claim 1, wherein the decision engine module is configured to determine the type and/or amount of the at least one information provision unit for providing the second information based on at least one of a current state of the system, operator preferences and success rates estimated by the reasoning agent.

3. The teleoperation system according to claim 1, wherein the at least one information provision unit comprises an electrical storage, and
the teleoperation system and/or the teleoperated device comprises a base- or charging station to charge the at least one information provision unit.

4. The teleoperation system according to claim 1, wherein the first and second information is fused into a 3D visual representation.

5. The teleoperation system according to claim 1, wherein the user interface comprises a visual interface that is configured to visualize the fused information.

6. The teleoperation system according to claim 1, wherein the reasoning agent module is further configured to determine viewpoints in the environment that define the location at which at least one information provision unit can be positioned in order to provide the second information on the environment and/or to determine a region of interest.

7. The teleoperation system according to claim 6, wherein the region of interest is determined based on at least one of the inputs of the operator, an assistant function behavior and a determination of a low-quality region.

8. The teleoperation system according to claim 6, wherein the at least one information provision unit is removably attachable to a stationary platform at a position that coincides with any of the determined viewpoints.

9. The teleoperation system according to claim 1, wherein the teleoperation system further comprises a persistent memory that is configured to store the fused information on the environment and/or store a past environment information.

10. The teleoperation system according to claim 1, wherein
at least one of the information gathering assistant module and the information provision unit comprises an information provision unit controller that is configured to provide control signals based on which the information provision unit provides the second information on the environment.

11. The teleoperation system according to claim 1, wherein
the at least one information provision unit comprises at least one of a sensor and a mirror.

12. The teleoperation system according to claim 10, wherein
the information provision unit controller is configured to change a pose of at least one of the sensor and the mirror.

13. The teleoperation system according to claim 1, wherein
the information provision unit controller is further configured to calculate a trajectory for a respective controllable movable platform.

14. The teleoperation system according to claim 13, wherein
the calculated trajectory is updated to avoid collisions with the teleoperated device and the at least one information provision unit.

15. A method for a teleoperation system, comprising:
providing first information on an environment of a teleoperated device by at least one sensor module that is comprised in the teleoperated device,
wherein at least one information provision unit of the teleoperation system comprises a movable platform and/or a controllable movable platform, and/or is removably attachable to the movable platform and/or the controllable movable platform, and the controllable movable platform is a portion of the teleoperated device;

predicting an intended action based on an input of the operator by an action predictor module that is comprised in the information gathering assistant module;

determining if the first information on an environment is sufficient to execute the intended action in the environment by a reasoning agent module;

determining second information on the environment suitable to enhance the environment information which is useful to execute the intended action in the environment by the reasoning agent module;

controlling provision of second information by the at least one information provision unit by the information gathering assistant module, wherein the at least one information provision unit that is attached to the portion of the teleoperated device as being capable of providing second information on the environment is determined by a decision agent module that is comprised in the information gathering assistant module only if the controllable movable portion is currently not controlled by the operator in a case that the portion of the teleoperated device belongs to a portion that is not controllable without changing the outcome of the intended action of the operator; and fusing the first and second information on the environment by an information fusion module.

* * * * *